United States Patent [19]

Baker

[11] 4,187,720
[45] Feb. 12, 1980

[54] FUEL LINE INJECTION SENSOR
[75] Inventor: Keith R. Baker, Waterloo, Iowa
[73] Assignee: Deere & Company, Moline, Ill.
[21] Appl. No.: 957,901
[22] Filed: Nov. 6, 1978
[51] Int. Cl.² ........................................... G01M 15/00
[52] U.S. Cl. .................................... 73/119 A; 73/702
[58] Field of Search ...................... 73/119 A, 753, 756, 73/702, 703

[56] References Cited

U.S. PATENT DOCUMENTS

| 3,511,088 | 5/1970 | Weaver | 73/119 A |
| 3,731,527 | 5/1973 | Weaver | 73/119 A |
| 4,002,155 | 1/1977 | Harned et al. | 123/148 E |
| 4,040,294 | 8/1977 | Masuda et al. | 73/117.3 |
| 4,109,517 | 8/1978 | Dyballa | 73/119 A |

FOREIGN PATENT DOCUMENTS 2308694  9/1974 Fed. Rep. of Germany ............. 73/753

Primary Examiner—Jerry W. Myracle

[57] ABSTRACT

A rugged and inexpensive sensor is disclosed for monitoring fuel injection characteristics such as injection pulse timing and width. A clamp is provided with hand grips and expandable jaws for quickly coupling to a fuel injection line. The jaws are biased into engagement with the line but are easily opened for releasing the clamp by urging the hand grips together. A transducer mounted on the clamp senses mechanical vibration caused by pressure pulsations in the line. The transducer is connected to circuitry for providing an output when the signal level from the transducer exceeds a threshold level. The sensor is self-compensating with the threshold level determined automatically from the maximum signal from the transducer. Therefore, different injection lines can be monitored with no manual adjustment of the clamp or circuitry even though the output of the transducer may vary from line to line.

13 Claims, 2 Drawing Figures

FUEL LINE INJECTION SENSOR

BACKGROUND OF THE INVENTION

The present invention relates generally to an engine monitoring system and more particularly to a device for sensing fuel line injection characteristics.

Analyzing the performance of engines which employ fuel injection, particularly diesel engines, requires an indication of the timing, as well as waveform information, such as the pulse width of pressure pulsations in the fuel injection lines. Various sensor systems have been devised for attachment to or within the injection line to provide a signal indicative of the pulsations. Some require the fuel line to be broken so the sensor can be placed in direct communication with the line. Typical of such previous devices is a diaphragm deflected by the fuel pressure wave to cause a resistive change in a transducer. A device of this type cannot be quickly and easily moved from line to line, is subject to continuous wear from fuel flow, and requires machined fittings which are expensive to manufacture. Different couplings are necessary to accommodate injection lines of various sizes.

Other devices utilize a piezoelectric transducer coupled to a fuel line to provide an output which varies with the radial expansion of the fuel line. These devices are expensive and often are easily damaged in the hostile environment to which they are subjected. Such devices are not only fragile but also are difficult to connect to the line. For proper repeatability of measurements, the piezoelectric-type transducer has to be engaged with the line using sufficient pressure for coupling. However, too much pressure can damage the transducer. Difficulty arises when trying to clamp the device properly when there is little working space around the engine under test, making connecting and preliminary adjustment of the transducer very time consuming.

Pressure sensitive transducers encased between a housing and the fuel line have also been used to monitor fuel injection. The housing must be rigidly attached to the line and requires either a permanent installation on the line or the bolting of split halves around the line. Such a device is not readily adaptable to different sized lines and cannot be quickly connected for use, especially where working space around the lines is limited.

Typical of other previous devices are transducers which are mounted permanently on the engine near the fuel injection nozzle. Since the transducers remain on the engine, they are subject to continuous abuse while the engine is operating. A separate transducer and its associated mounting hardware are necessary for each cylinder, multiplying the cost of the test system.

Although various transducer devices have heretofore been utilized to monitor fuel line injection, none have proved to be entirely satisfactory. Coupling the transducer to the line has been too time consuming especially where space is limited. Most are not adapted for easily and quickly moving the device from one line to another, particularly where there is a change in line diameter, and most do not hve self-adjusting or self-compensating features. Piezoelectric-type transducers are often used, and they are expensive and easily damaged. They tend to have a short lifetime when used in the environment of an engine diagnostic system.

SUMMARY OF THE INVENTION

It is therefore an object of this invention to provide a fuel line sensor which is easily and inexpensively produced and yet is sufficiently rugged to withstand repeated use in a hostile environment.

It is a further object of this invention to provide an inexpensive sensor having a self-tightening clamp which can be utilized with fuel lines of varying types and sizes and which can be quickly connected to the line for use.

It is still a further object of this invention to provide an injection sensor which includes a clamp which temporarily connects to the fuel line and a microphone-type pickup attached to the clamp for sensing mechanical vibration of the line caused by pressure pulsations.

It is a further object to provide an injection sensor having a transducer with a circuit coupled thereto which automatically compensates for the variations in the output of the transducer as different lines are tested.

Other features and advantages of the invention will become apparent upon reading the following detailed description and upon reference to the drawings.

DESCRIPTION OF THE PREFERRED EMBODIMENT

Figure 1:
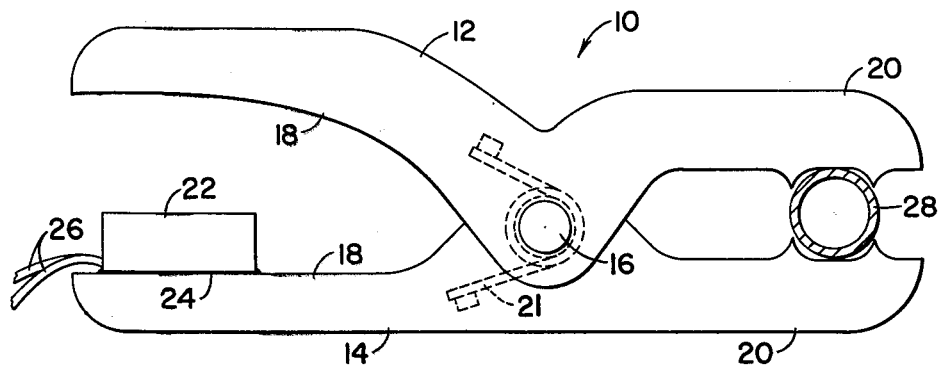
FIG. 1 is a side view of the sensor device of the present invention.

Referring to FIG. 1, the clamp-on device of the present invention is shown generally at 10 and includes members 12 and 14 pivotally connected together in a conventional manner with pivot pin 16. Each of the members 12 and 14 includes a hand grip portion 18 on one side of the pivot and a jaw member 20 on the opposite side of the pivot. A spring member 21 urges the hand grip portions 18 apart, thus biasing the jaw members 20 closed. A transducer 22 is attached to the inwardly facing side of member 14 by a bonding agent such as epoxy 24 or by another suitable method. Conductors 26 connect the output of the transducer 22 to the signal processing circuitry discussed below. Jaw members 20 are shown clamped about a fuel injection line or conduit 28.

Transducer 22 preferably is an acoustical magnetic pickup or similar device which is rugged and can provide an output signal indicative of mechanical vibration transmitted to it through the clamp 10. In the preferred embodiment, transducer 22 includes a coil mounted for relative motion with respect to a magnetic member. The relative motion of the coil and the magnetic member as vibrations are received by the transducer induces a voltage in the coil which is transmitted via conductors 26 to the processing circuitry.

Figure 2:
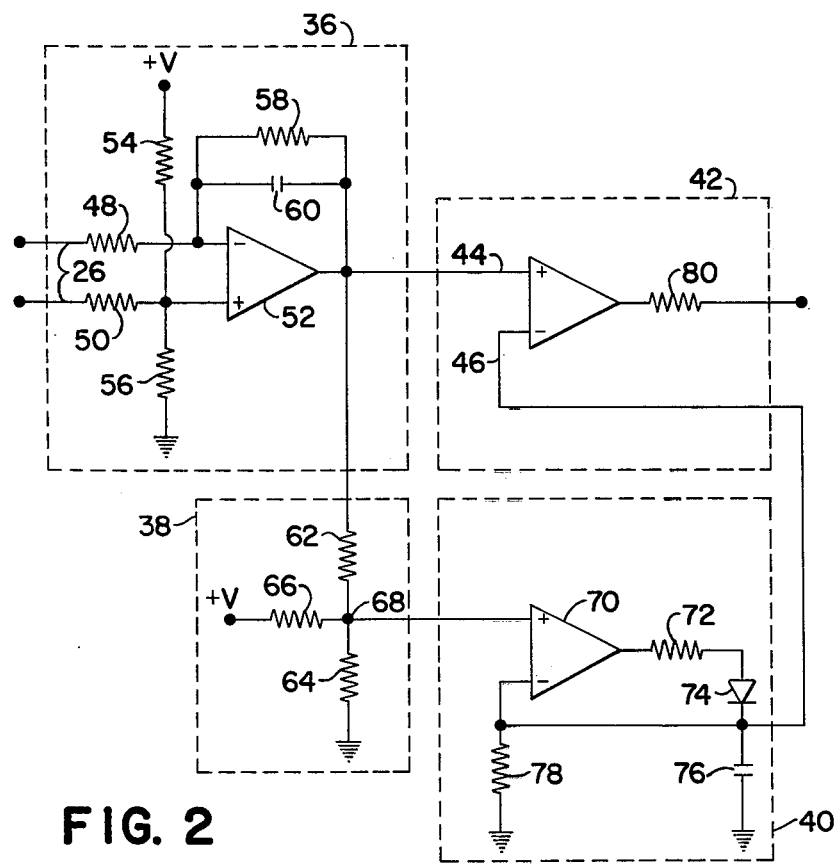
FIG. 2 is a circuit diagram illustrating an embodiment of the circuitry used with the device of FIG. 1.

As seen in FIG. 2, the processing circuitry includes an amplifier 36 connected to conductors 26 of transducer 22. The output of the amplifier 36 is connected to a divider circuit 38. A peak detector 40 is connected to the output of the divider 38. A comparator 42 has one input 44 connected to the output of amplifier 36 and the other input 46 connected to the output of the peak detector 40. Comparator 42 provides a logic output when the output level of amplifier 36 exceeds a threshold level on input 46. The divider 38 and peak detector 40 establish the threshold level at a fraction of the peak output level of the amplifier 36.

FIG. 2 shows a complete schematic of the circuitry to provide a logic output from the comparator 42 upon the occurrence of a pressure pulsation in fuel line 28. Conductors 26 are connected to input resistors 48 and 50 of operational amplifier 52. A biasing network including resistors 54 and 56 is connected to the positive input of amplifier 52. The values of resistors 54 and 56 are chosen so that the average d-c level of the output of the amplifier 52 is between ground and the power supply voltage +V and preferably about one-half the power supply voltage. Feedback resistor 58 is connected between the output and the negative input of amplifier 52 to limit the gain of the circuit. A stabilizing capacitor 60 is connected in parallel with feedback resistor 58.

The output of amplifier 36 is connected to divider 38 which includes resistors 62 and 64. A biasing resistor 66 is connected between the power supply and junction 68 to raise the average d-c level at that point to slightly above the d-c level from the output of amplifier 52 on line 44. The level of the a-c signal at junction 68 will be a fraction of the value of the level at the output of amplifier 36. The percent reduction is easily determined by the resistance values of the resistors 62, 64 and 66. Assuming the +V terminal is essentially an a-c ground, the a-c signal level at junction 68 will be reduced to approximately Reff/(R62+Reff) of the output level of amplifier 36, where Reff is the resistance of R64 in parallel with R66.

Terminal 68 is connected to the positive input terminal of operational amplifier 70 in peak detector 40. The output of amplifier 70 is connected through a stabilizing and current limiting resistor 72 and a diode 74 to a capacitor 76. Capacitor 76 and discharge resistor 78 are connected in parallel between the diode and ground, and preferably their values are chosen so their RC time constant is much larger than the average time between injections to be detected by the sensor. Feedback is provided from the capacitor 76 to the negative input terminal of amplifier 70. The capacitor 76 will charge to approximately the peak level sensed at terminal 68.

The negative input 46 of comparator 42 is connected to capacitor 76. The output of amplifier 36 is connected directly to the positive input 44 of comparator 42 so that when the amplifier 36 output exceeds the peak detector voltage output on capacitor 76, there is a positive transition in the output of comparator 42. The output remains positive as long as the output of amplifier 36 exceeds the peak detector output. The comparator output is connected through an output resistor 80 to further processing circuitry (not shown) for evaluating fuel injection characteristics such as injection timing, injection pulse duration, and the like. The output from comparator 42 can also be used to determine engine RPM.

The operation of the injection sensor will now be described referring to FIGS. 1 and 2. Jaws 20 of the clamp 10 are opened as the hand grip portions 18 are urged together against the bias of spring 21. Device 10 is positioned so the fuel injection line 28 is located inwardly from the ends of jaws 20. The operator releases grips 18, and jaws 20 are firmly biased by spring 22 into contact with the line 28 so that vibration in the line caused by pressure pulsations will be transmitted to the clamp 10 and to transducer 22. It should be noted that jaws 20 automatically conform to and are secured about the line without mechanical adjustment.

Assuming initially that no injection is occurring and therefore only negligible signal is present from transducer 22, the output of amplifier 36 is at its d-c steady state level between ground and +V. Terminal 68 remains at a d-c level which is determined by divider 38, and which is set above the d-c steady state level of amplifier 36. The output of peak detector 40 and therefore the negative input of comparator 42 remains at the d-c level of terminal 68, which is higher than the level at the positive input so the comparator 42 output remains at its low level.

As injection occurs through line 28, the pressure pulsations in the line cause vibrations which are transmitted to clamp 10 through jaws 20. These vibrations in the clamp are detected by transducer 22. Movement of the coil and magnet with respect to each other produces a voltage signal indicative of the vibrations resulting from the pulsations in the fuel line 28. The transducer signal which is a ringing waveform with noise is amplified in amplifier 36. Peak detector 40 responds to the most positive level of the amplifier signal reduced by a factor determined by divider 38. Diode 74 allows capacitor 76 to charge quickly toward the highest voltage at terminal 68 sensed by the positive input terminal of amplifier 70, but the discharge time constant is determined by the time constant of resistor 78 and capacitor 76. Since this time constant is much greater than the time between injection pulses through line 28, the voltage at capacitor 76 and thus the reference threshold level of comparator 42 remains essentially at the given fraction of the peak signal level from amplifier 36. When the signal from amplifier 36 exceeds this fraction, the output of comparator 42 goes to its high level. The circuitry therefore compensates for any variations in the level of vibrations detected by the transducer as the clamp is moved from line to line. The variations can be caused by such things as differing line sizes and vibration transmitting characteristics. A high level output is provided only when the signal level from the amplifier 36 exceeds a predetermined percentage of the peak level. In a preferred embodiment, the resistance values in divider 38 are chosen so that there is a transition in the output level of comparator 42 at approximately 70–85 percent of the peak signal level out of amplifier 36 during an injection period. This range was found to adequately assure a transition occurs during a pulsation but there is no transition when noise alone is present on the fuel line.

A list of components for the preferred embodiment follows:

| Reference Number | Component |
|---|---|
| Resistors | |
| 48,50 | 1.5K |
| 54,56 | 30K |
| 58 | 15K |
| 62 | 22K |
| 64 | 68K |
| 66 | 82K |
| 72 | 100 |
| 78 | 100K |
| 80 | 470 |
| Capacitors | |
| 60 | 100pf |
| 76 | 0.1 uf |
| Integrated Circuits | |
| IC 42,52,70 | CA 3160 |

In an alternate embodiment, rather than mounting a complete transducer on one grip portion 18, a coil may be connected to one grip 18 with a magnet depending from the opposite grip and extending through the coil. As vibrations are received, the magnet moves relative to the coil and induces a voltage therein.

The clamp 10 can be fashioned from a readily available crocodile-type connector similar to that commonly used as a battery clamp. The transducer 22 can be a moving coil or condensor type used in microphone pickups. The circuitry used with the sensor is relatively simple yet highly effective. The overall cost of the entire unit is only a small fraction of that of previously available sensors and yet is more rugged and more easily connected up for use. The unit is self-compensating and can be used without adjustment on most all types of injection systems having an accessible flow line. The clamp 10 is easily secured to the line without the need of tightening screws or the like. The operator simply positions the clamp and releases the hand grip portions 18 which are urged apart by spring 21 closing jaws 20 about the line 28.

I claim:

1. A device for sensing pulsating fluid flow caused vibrations in a conduit and providing a signal indicative of one or more characteristics of the flow in the conduit, the device comprising:

self-closing and manually releasable clamp means adapted to be clamped to the conduit so that vibrations in the conduit are transmitted to the clamp;

pickup means mounted on the clamp means for providing a variable level signal indicative of the vibrations; and signal processing means connected to the pickup means for receiving the variable level signal and providing an output indicative of a characteristic of the flow in the conduit, the signal processing means comprising first circuit means for amplifying the variable level signal, peak detector means for establishing a reference level indicative of but less than the peak level of the amplified signal, and comparator means for comparing the reference level and the amplified signal.

2. The invention defined in claim 1 wherein the clamp means includes a pair of opposed hand grip portions and wherein the pickup means comprises a microphone pickup carried on one of the grip portions.

3. The invention defined in claim 1 wherein the characteristic is the time of occurrence of a pulsation.

4. For use in detecting characteristics of a fuel injection system having a flow line with pulsating flow therethrough, the flow causing mechanical vibrations in the line, an injection sensor comprising:

clamp means releasably securable to and self-closing on the flow line for receiving vibration from the line;

transducer means mounted on the clamp means and responsive to vibrations received from the flow line by the clamp means for providing a first signal indicative of the vibrations;

circuit means for providing a threshold signal indicative of the maximum level of the first signal; and means responsive to the first signal and the threshold signal for providing a second signal upon the occurrence of a preselected relationship between the amplitude of the first signal and the threshold signal.

5. The invention defined in claim 4 wherein the circuit means includes peak detector means for establishing the threshold signal from the first signal.

6. A pickup device for mounting on a fuel injection line of an engine comprising:

clamp means including a handle means, normally closed opposed jaw members connected to the handle means and openable for receiving the injection line therebetween, and biasing means for urging the jaw members toward the normally closed position to secure the clamp to the line;

vibration responsive transducer means connected to the handle means for providing a variable level signal indicative of vibrations in the line, the handle means including two adjacent grip members extending outwardly from the jaw members, the grip members having opposed inwardly facing surfaces, one of said surfaces carrying the transducer means; and circuit means responsive to the signal for providing an output indicative of an injection characteristic including means for automatically adjusting the response of the circuit means in accordance with changes in the level of the signal.

7. The invention defined in claim 6 wherein the transducer means comprises a magnetic transducer.

8. The invention defined in claim 6 wherein the grip members are pivotally connected and each grip member is secured to a jaw member, and wherein the jaw members are openable as the grip members are pivoted together.

9. A fuel line injection sensor for providing an electrical indication at the time of occurrence of fuel injection through a conduit comprising:

a pickup member securable to the conduit and including transducer means for sensing vibrations in the conduit caused by injection and for providing a variable level signal indicative of the vibrations; and circuit means connected to the transducer means and including means for sensing the variable level signal and establishing a reference signal therefrom, and means for comparing the variable level and reference signals and providing an output upon the occurrence of a predetermined relationship therebetween.

10. The invention defined in claim 9 wherein the predetermined relationship is the level of the signal exceeding the reference level.

11. An injection sensor for providing an indication of the occurrence of a pressure pulsation in a fuel injection line, the pulsation causing vibrations in the line, comprising:

a spring actuated clamp member for temporarily attaching to the line to receive vibrations therefrom;

a magnetic transducer mounted on the clamp member for providing a variable level signal indicative of the vibrations received by the clamp member;

an amplifier connected to the transducer for amplifying the signal;

circuit means for providing a reference level signal indicative of the maximum level of the amplified signal; and means for comparing the amplified signal with the reference level signal and for providing an output only when the amplified signal exceeds a predetermined percentage of the maximum level.

12. The invention defined in claim 11 wherein the circuit means comprises a divider circuit connected to the amplifier and a peak detector connected to the divider circuit for providing the reference level signal.

13. The invention defined in claim 11 wherein the predetermined percentage is approximately 70 to 85 percent.

* * * * *

UNITED STATES PATENT OFFICE
CERTIFICATE OF CORRECTION

Patent No. 4,187,720  Dated 12 February 1980

Inventor(s) Keith R. Baker

It is certified that error appears in the above-identified patent and that said Letters Patent are hereby corrected as shown below:

Column 5, line 14, after "yet", insert -- the unit --.

Signed and Sealed this

Thirtieth Day of September 1980

[SEAL]

Attest:

SIDNEY A. DIAMOND

Attesting Officer

Commissioner of Patents and Trademarks